United States Patent [19]

Wise

[11] Patent Number: 4,719,556

[45] Date of Patent: Jan. 12, 1988

[54] CURRENT AND VOLTAGE LIMITED INVERTER

[75] Inventor: Fred W. Wise, Windsor, Pa.

[73] Assignee: Armstrong World Industries, Inc., Lancaster, Pa.

[21] Appl. No.: 893,996

[22] Filed: Aug. 7, 1986

[51] Int. Cl.[4] .................................... H02H 7/122
[52] U.S. Cl. ................................. 363/56; 363/132
[58] Field of Search ............... 363/17, 56, 98, 132, 363/71

[56] References Cited

U.S. PATENT DOCUMENTS 4,263,642  4/1981  Simmons et al. ............. 363/132 X
4,346,332  8/1982  Walden .......................... 363/98 X Primary Examiner—Peter S. Wong

[57] ABSTRACT

An electronic inverter with sharply limited output voltage and current despite wide variations in load impedance. A particular configuration of passive reactances on the output of a conventional semiconductor inverter assures that voltage is limited with varying impedance loads which might otherwise increase the output voltage, and it also guarantees that even a short circuited load will not exceed the current limitation of the circuit.

4 Claims, 1 Drawing Figure

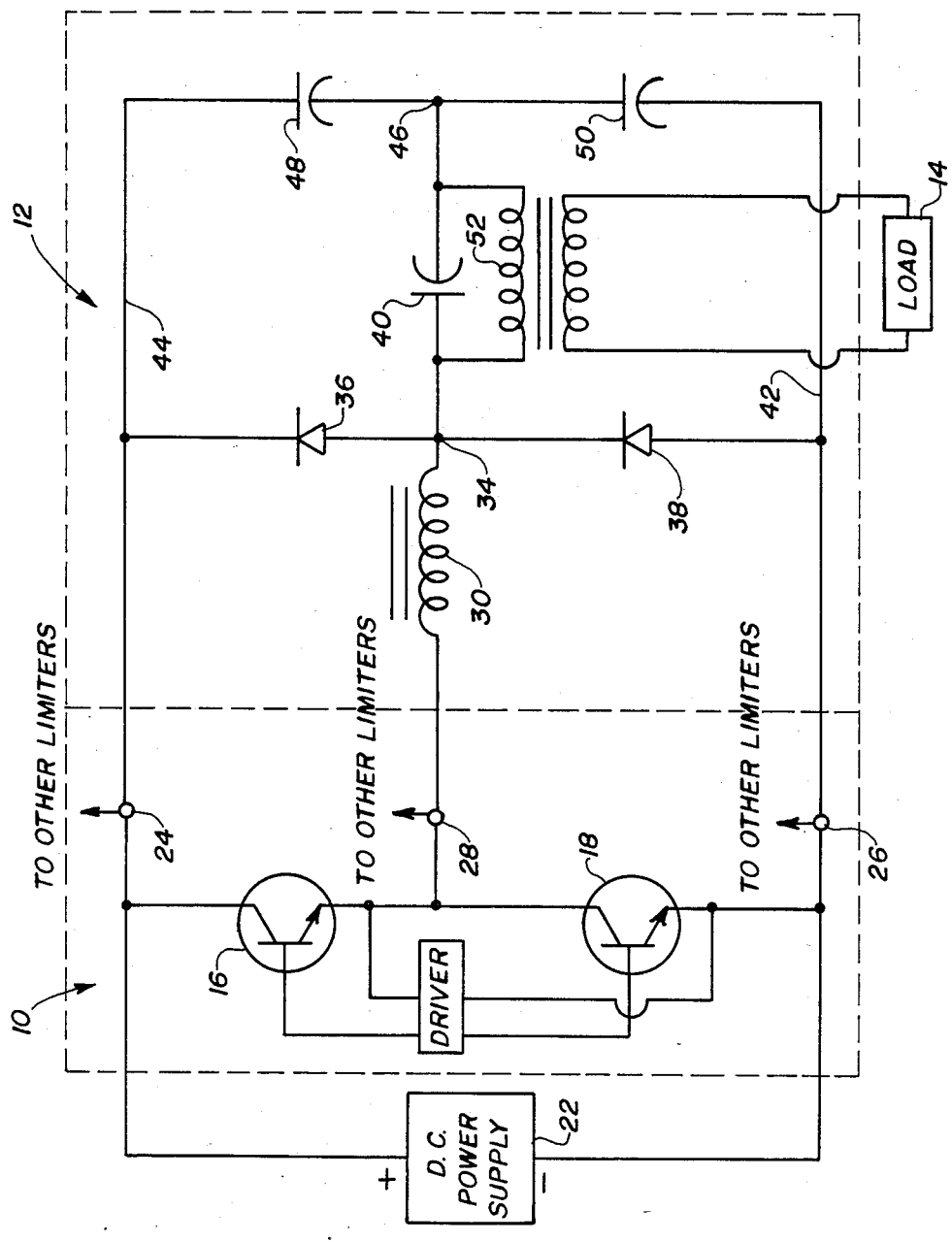

CURRENT AND VOLTAGE LIMITED INVERTER

BACKGROUND OF THE INVENTION

This invention deals generally with electrical power conversion systems and more specifically with an ultrasonic frequency inverter which limits the voltage and current output over a wide range of loads.

DESCRIPTION OF THE PRIOR ART

Power inverters are quite common in the electronics industry and have been suggested and patented for driving lighting circuit for some time. Nevertheless, the use of such circuits is not widespread.

SUMMARY OF THE INVENTION

It has become apparent, however, that the combination of such circuits with fluorescent lights can afford considerable advantage in efficiency if the installation of such units can be made convenient and economical. One desirable type of installation is an arrangement in which a single inverter powers multiple fluorescent light fixtures within a suspended ceiling and is interconnected with them by the use of multiple flexible cables with detachable plug-receptacles which facilitate rearrangement of fixtures. Such an installation will normally permit rearrangement by personnel other than electricians. However, regulatory codes such as the National Electrical Code place stringent limitations on the voltage and current which can be derived from the several receptacles of such a system. Moreover, it would appear to be advantageous that the limitation of current and voltage be accomplished by passive devices rather than active devices such as transistors or mechanically variable transformers. The present invention addresses just these problems by furnishing multiple outputs from an ultrasonic frequency inverter, with each output limited in both current and voltage such that load changes due to operation of a fluorescent lamp distribution system do not surpass the limits specified by the National Electrical Code.

This is accomplished by the use of an inductive reactance in series with the output transformer and a capacitive reactance across the primary winding of the output transformer. Moreover, the series inductor is selected so that, at the frequency of operation, its reactance limits the current of a short circuit to a value below the desired limitation.

Clamping diodes placed across the input of the transformer limit the output voltage to the desired value. This system yields a constant output voltage over a wide range of load impedances. Low impedance resistive or inductive loads result in greater voltage drop across the series inductor of the circuit to a point where the clamping diodes need not function, while a higher impedance load causes the clamping diodes to function to limit the output voltage. This clamping function is instantaneous and automatic and thus does not have the inherent difficulties of time lag or lower reliability which result when an active transistor type regulating circuit is used.

The result is a constant peak to peak output voltage over a wide range of capacitive load and also a constant voltage over a somewhat more limited range of resistive and inductive loads. This type of load is typical of that presented by a "series L-C" type fluorescent lamp ballast, so that the combination of the present invention with fluorescent lamp fixtures yields a system that is not only highly efficient, but also voltage and current limited, so that the desirable goal of flexible cables and plug and receptacle connections can be made available within the specifications of the National Electrical Code. Additionally, this circuit configuration presents an inductive loading to the inverter stage under all output loading conditions.

BRIEF DESCRIPTION OF THE DRAWING

The figure is an electronic circuit diagram depicting a preferred embodiment of the invention.

DETAILED DESCRIPTION OF THE INVENTION

The figure is a schematic diagram of the electronic circuit of a preferred embodiment of the invention in which typical ultrasonic inverter 10 is interconnected with limiter circuit 12 to feed load 14. In the typical situation, load 14 is a conventional fluorescent lamp fixture with two lamps with a series L-C circuit ballast. This presents a varying load on limiter circuit 12 depending upon whether the lamps are starting, operating, or, in some cases, malfunctioning. Limiter circuit 12 performs its function even if load 14 is removed from the circuit leaving an open circuit on the output of the limiter circuit 12.

Limiter circuit 12 also performs its function if load 14 is replaced by a short circuit. The unique characteristics of limiter circuit 12 are obtained by clamping the voltage swing across capacitor 40 to a predetermined value. In the absence of clamping diodes 36 and 38, the voltage swing across capacitor 40 would, under many conditions of loading, exceed the desired voltage due to the effects of voltage step-up associated with the series L-C circuit. If capacitor 40 were not in the circuit, the output voltage swing would be lower than the voltage swing at terminal 28 with a resistive load, due to the drop across inductor 30. Capacitor 40 is selected such that in the absence of clamping diodes 36 and 38, the output voltage is greater than the desired value. The effect of this action is to provide a constant output voltage when the load impedance is at or above the nominal operating impedance.

As shown in the figure, inverter 10 is constructed in typical fashion with two transistors 16 and 18 and conventional driver circuit 20. D.C. power supply 22 is also conventional and supplies its output not only to inverter 10 but also to the balance of limiter circuit 12, and also, by means of connections 24 and 26 to other additional limiter circuits (not shown). Connection 28, which is also an output of inverter 10, similarly feeds other limiter circuits (not shown) which are connected essentially in parallel with limiter circuit 12 and feed their own independent load circuits (not shown).

Limiter circuit 12 is therefore only one of several such identical circuits, each connected to D.C. power supply 22 and inverter 10 at connections 24, 26 and 28. All these circuits are constructed and operate identically, so that only limiter circuit 12 is discussed here. Of course, the power capabilities of power suply 22 and inverter 10 are designed to be appropriate for the total number of limiter circuits and loads being supplied.

Limiter circuit 12 is constructed of a few components, which are essentially passive in nature, but their particular values and the circuit configuration create a circuit which limits both current and voltage despite load variations, and also furnishes a constant voltage over a wide variation of loads.

In limiter 12, inductor 30 is connected in series with inverter output connection 28. At the remote end of inductor 30 is junction point 34 to which are connected clamping diodes 36 and 38 and capacitor 40. The other sides of clamping diodes 36 and 38 are connected, respectively, to inverter power supply buss 44 and inverter power supply buss 42. Capacitor 40 is also connected to junction point 46 from which capacitors 48 and 50 are connected to provide an AC return path to DC power supply busses 44 and 42, respectively. The primary of transformer 52, the secondary of which powers load 14, is connected across capacitor 40.

The selection of inductor 30, capacitor 40 and transformer 52 give limiter circuit 12 its unique characteristics. Inductor 30 is selected so that, at the operating frequency of inverter 10, its reactance is such that, even with a short on its output, the current will be limited to the selected design maximum current.

Transformer 52 is selected with a turns ratio so that, if the square wave voltage output of inverter 10 were applied across its input, the voltage impressed upon load 14 would be below the selected design maximum voltage.

The value of capacitor 40 is selected so that its reactance is somewhat greater than that of inductor 30 at the frequency of inverter 10. Typically its reactance is approximately twice the reactance of inductor 30.

In one embodiment of the circuit, inductor 30 has a value of 1.4 millihenries, capacitor 40 has a value of 0.022 microfarads and transformer 52 is a stepdown transformer which has a turns ratio of 1.75 to 1. Other component values are: capacitors 48 and 50, 0.22 microfarads; and diodes 36 and 38, 5 amp. 600 volt.

This embodiment of the invention operates at 23.3 kHz and has 370 volts D.C. between terminals 24 and 26. On the secondary of transformer 52, the open circuit voltage is 105 volts peak and 91.4 volts R.M.S. The short circuit current is 2.1 amps peak and 1.38 amps R.M.S.

OPERATION OF THE PREFERRED EMBODIMENT

The desired parameters are accomplished in the following manner.

An alternating square wave voltage is produced between terminal 28 and junction point 46 by inverter 10 in conventional manner because capacitors 48 and 50 pass the A.C. component of the voltage from junction point 46 to D.C. busses 44 and 42.

In the absence of inductor 30 and capacitor 40, transformer 52 would be a load upon this alternating voltage and merely change the voltage magnitude by means of its turns ratio. The addition of inductor 30 in series with transformer 52, however, limits the short circuit current to that determined by the reactance of inductor 30.

The addition of capacitor 40 across the primary of transformer 52 forms a low pass filter resulting in reduction of spurious output and also increases the voltage at the operating frequency of inverter 10 such that, if diodes 36 and 38 were not in the circuit, the no load output voltage across the secondary winding of transformer 52 would actually be above the desired design limitation.

Diodes 36 and 38, however, clamp the voltage at junction point 34 to approximately that of the D.C. busses 44 and 42. Thus, over a wide range of loads, the voltage, which could tend to be higher than the desired design limit as component values approach resonance, is held by the clamping action to the required limit.

This characteristic constant peak to peak voltage is effective over a wide range of capacitive loads and over a more limited range of resistive and slightly inductive loads. The circuit results in a nearly constant output voltage when a typical "series L.C. circuit" fluorescent lamp ballast is its load.

In the present invention, the inductor-capacitor circuit of limiter 12, while not resonant, would provide a voltage step-up in the absence of the clamping diodes. This permits a wide variation in loads which may cause it to approach resonance and which would, except for the operation of the clamping function, cause the voltage to increase. The range of operation of the circuit therefore includes those parameters which would cause it not only to reach resonance, but pass through it and go beyond until the equivalent operating point on the other side of the resonance curve is reached at which the voltage decreases below the clamping value.

The present invention, therefore, effectively buffers the inverter from the load thus preventing the damage to inverters which may occur when the load is capacitive.

Moreover, the invention filters the otherwise square wave inverter output to a sine wave output, thereby dramatically reducing electromagnetic interference.

It is to be understood that the form of this invention shown is merely a preferred embodiment. Various changes may be made in the function and arrangement of parts, equivalent means may be substituted for those illustrated and described, and certain features may be used independently from others without departing from the spirit and scope of the invention as defined in the following claims.

For example, capacitor 40 could be located at the secondary winding of transformer 52 or a different inverter circuit could be used, or capacitors 48 and 50 could be made an integral part of inverter 10.

What is claimed is:

1. A voltage and current limiter circuit for an alternating current supply comprising:
   (a) first and second input connectors for connection to an alternating current supply;
   (b) an inductance connected in series with the first input connector, the value of the inductance being selected so that its reactance at the frequency of the alternating current supply limits the current through the inductance to a predetermined value;
   (c) a capacitance connected between the second input connector and the inductance, the value of the capacitance being selected so that its reactance at the frequency of the alternating current supply is greater than that of the inductance;
   (d) first and second diodes each connected to a junction point between the inductance and the capacitance, the diodes being connected so that each will conduct current of a different polarity to the junction point;
   (e) direct current power supply means interconnected with the alternating current supply and with each of its positive and negative terminals connected to one of the diodes so that the diodes clamp the voltage of the junction point to approximately the voltage of the direct current power supply means in both the positive and negative polarities, thereby limiting the voltage across the capacitance to a predetermined value; and (f) load connections, electrically connected to the opposite ends of the capacitance, to which a load can be interconnected.

2. The limiter circuit of claim 1 further including transformer means, the primary of which is connected to the load connections and the secondary of which can be connected to a load.

3. The limiter circuit of claim 1 wherein the direct current power supply means is an integral part of the alternating current supply.

4. The limiter circuit of claim 1 wherein the alternating current supply is an inverter with an output of ultrasonic frequency.

* * * * *